United States Patent [19]

Wofford et al.

[11] Patent Number: 4,735,855

[45] Date of Patent: Apr. 5, 1988

[54] THERMOFORMABLE LAMINATE

[75] Inventors: George D. Wofford, Duncan; Jack L. Shriver, Jr., Inman, both of S.C.

[73] Assignee: W. R. Grace & Co., Cryovac Div., Duncan, S.C.

[21] Appl. No.: 892,985

[22] Filed: Aug. 4, 1986

[51] Int. Cl.$^4$ .................... B32B 27/00; B32B 27/08
[52] U.S. Cl. .................... 428/349; 428/474.4; 428/475.5; 428/475.8; 428/476.3; 428/516
[58] Field of Search ............... 428/475.8, 476.3, 474.4, 428/35, 349, 516, 475.5

[56] References Cited

U.S. PATENT DOCUMENTS

| | | | |
|---|---|---|---|
| 3,912,843 | 10/1975 | Brazier | 428/475.8 |
| 4,407,873 | 10/1983 | Christensen et al. | 428/475.8 |
| 4,501,798 | 2/1985 | Koschak et al. | 428/475.8 |
| 4,612,221 | 9/1986 | Biel et al. | 428/475.8 |
| 4,640,852 | 2/1987 | Ossian | 428/475.8 |
| 4,683,170 | 7/1987 | Tse et al. | 428/474.4 |

Primary Examiner—Alexander S. Thomas
Assistant Examiner—James J. Seidleck
Attorney, Agent, or Firm—John J. Toney; William D. Lee, Jr.; Mark B. Quatt

[57] ABSTRACT

A thermoformable polymeric laminate with good optical properties, extended shelf life, and memory characteristics comprises a core layer comprising an oxygen barrier material; a polyamide layer disposed on each surface respectively of the core layer, the polyamide having controlled crystallinity; a sealant layer; an outer layer comprising a moisture barrier material; and an intermediate layer disposed between the polyamide layer and each of the sealant layer and outer layer respectively, and comprising an anhydride grafted polyolefin.

8 Claims, 1 Drawing Sheet under the 4,735,855

THERMOFORMABLE LAMINATE

BACKGROUND OF THE INVENTION

This invention relates generally to thermoplastic packaging, and more specifically to packaging laminates for food products.

It is common practice to package articles such as food products in thermoplastic films or laminates to protect the product to be packaged from abuse and exterior contamination, and to provide a convenient and durable package for transportation and ultimate sale to the end user.

Thermoforming and other similar techniques are well known in the art for packaging food products. Suitable thermoforming methods, for example, include a vacuum forming or plug-assist vacuum forming method. In a vacuum forming method, the first web is heated, for example, by a contact heater and a vacuum is applied beneath the web causing the web to be pushed by atmospheric pressure down into a preformed mold. In a plug-assist vacuum forming method, after the first or forming web has been heated and sealed across a mold cavity, a plug shape similar to the mold shape impinges on the forming web and, upon the application of vacuum, the forming web transfers to the mold surface.

After the forming web is in place, a product is placed, such as by manual loading, on the forming web and a second, substantially non-forming web is disposed over the product. At a sealing station, the packages vacuumize and fusion seal with a sealing device such as a heated jaw. The first or forming web encloses a substantial portion, generally more than half, of the product to be packaged.

Thermoforming is a popular method of packaging meat products such as bacon. In packaging such products, it is desirable to provide a clear package with good optical properties such as clarity and gloss in order to enhance package appearance for the consumer.

Color retention of the product, particularly in the case of meat products, and extended shelf life are also advantageous features.

Finally, it is desirable to provide a packaging material, which, after the thermoforming operation, will maintain a tight package appearance, commonly known in the art as good memory characteristics.

It is, therefore, an object of the present invention to provide a thermoplastic laminate having good optical properties such as clarity and high gloss.

It is also an object of the present invention to provide a thermoplastic laminate for packaging food products wherein good color retention and shelf life are obtained.

It is yet another object of the present invention to provide a thermoplastic laminate characterized by good oxygen barrier properties over an extended shelf life.

SUMMARY OF THE INVENTION

The instant invention is directed to a thermoformable polymeric laminate comprising a core layer comprising an oxygen barrier material; a polyamide layer disposed on each surface respectively of the core layer, the polyamide having controlled crystallinity; a sealant layer; an outer layer comprising a moisture barrier material; and an intermediate layer disposed between the polyamide layer and each of the sealant layer and outer layer respectively, and comprising an anhydride grafted polyolefin.

In another aspect of the present invention, a method for producing a laminate comprises coextruding a core layer comprising an oxygen barrier material; a polyamide layer disposed on each surface respectively of the core layer, the polyamide having controlled crystallinity; a sealant layer; an outer layer comprising a moisture barrier material; and an intermediate layer disposed between the polyamide layer and each of the sealant layer and outer layer respectively, and comprising an anhydride grafted polyolefin; said layers extruded through several extruders; joining said extruded layers at a die to form a total coextrusion; drawing the coextrusion from the die; quenching the coextrusion; and winding the coextrusion into rolls.

DEFINITIONS

"Controlled crystallinity" is used herein to defined a characteristic of some polyamides having a small amount of a nucleating agent such as talc. These agents are believed to set up nucleating sites in the resin around which more consistently sized crystallites grow. This in turn provides improved package tightness. The term "controlled crystallinity" therefore refers to at least some control in the nature and extent of crystallization in a polyamide, resulting in a thermoformed package with adequate or improved package tightness.

"Oxygen barrier" is used herein to refer to polymeric materials having oxygen transmission rates of less than about 10 cc/m$^2$, in 24 hours at 73° F. (STP), and preferably less than about 1 cc/m$^2$, 24 hours, 73° F. (STP). Such materials include e.g. ethylene vinyl alcohol copolymer, and vinylidene chloride copolymers.

"Polyamide" is used herein to refer to high molecular weight polymers having amide linkages along the molecular chain, and refers more specifically to synthetic polyamide such as various nylons.

"Ethylene vinyl alcohol copolymer" is used herein to refer to a vinyl alcohol copolymer having an ethylene comonomer, and prepared by e.g. hydrolysis of vinyl acetate copolymers, or by chemical reactions with polyvinyl alcohol.

"Polyolefin" is used herein broadly to include polyethylene, ethylene copolymers having a small amount of a comonomer such as vinyl acetate, ethylene-alpha olefin copolymers (LLDPE), polypropylene, polybutene, and other resins falling in the "polyolefin" family classification.

BRIEF DESCRIPTION OF THE DRAWINGS

Further details are given below with reference to the sole FIGURE drawing, wherein.

DESCRIPTION OF THE PREFERRED EMBODIMENTS

Figure 1:
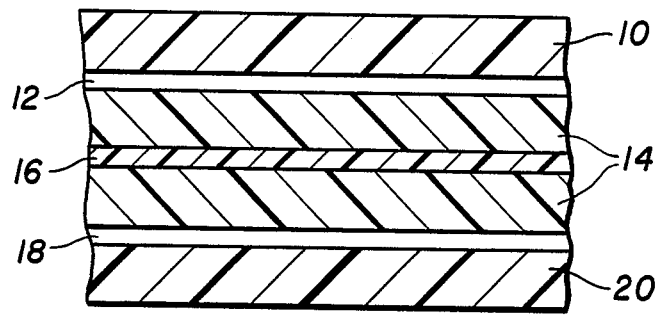
FIG. 1 is a schematic cross-section of a preferred embodiment of a thermoformable laminate of the invention.

Referring specifically to the sole drawing, in FIG. 1 a schematic cross-section of a preferred embodiment of the thermoformable laminate of the invention is shown. The film structure is directed to a multi-layer composite having the generalized structure of (outside) A/B/C/D/C/B/E (inside) where A is an outer moisture barrier layer, B is an intermediate adhesive layer, C is a polyamide layer, D is an oxygen barrier layer, and E is a sealant layer.

Preferably, outer layer 10 serves as an abuse layer, and as a moisture barrier layer to protect oxygen barrier core layer 16 in the event that the oxygen barrier characteristics of the material forming layer 16 is sensitive to moisture. Preferably, outside layer 10 is propylene homopolymer or copolymer.

Oxygen barrier layer 16 is preferably an ethylene vinyl alcohol copolymer such as EVAL F101 available from Evalca. This material exhibits excellent oxygen barrier properties at low humidities with lesser barrier qualities at higher humidities, but in combination with a moisture barrier layer 10 extends the shelf life of a food product contained in the laminate of the invention.

On either side of the barrier layer 16 are polyamide layers 14 comprising nylon 6 and more preferably nucleated nylon 6. The nucleating agent in the nylon 6 is believed to set up nucleation sites around which more consistently sized crystallites grow. This in turn provides improved package tightness in the final packaged product. A suitable nucleating agent is, for example, talc.

Sealant layer 20 is preferably an ionomer such as Surlyn, available from DuPont Company. These materials are essentially metal saltneutralized copolymers of ethylene and acrylic or methacrylic acid. Other suitable sealant materials include polyolefins, ethylene-alpha olefin copolymers, and blends thereof.

Tie layers 12 and 18 respectively assure adhesion between polyamide layers 14 and outer layer 10 and sealant layer 2 respectively. These tie layers may be identical or different from each other, and may include a wide range of anhydride/grafted polyolefins including those based on ethylene vinyl acetate copolymer, polypropylene, low density polyethylene, linear low density polyethylene, and very low density polyethylene. Commercial examples of such materials are those marketed under the name Plexar available from Norchem, the CXA series from DuPont, and the like.

The thermoformable laminate of the present invention provides good optical properties including clarity and high gloss, good color retention (in meat products), extended shelf life, and good memory characteristics, i.e. the ability of the laminate after the thermoforming process to maintain a tight package appearance.

Laminates in accordance with the present invention may be made by extruding the various resins through five, six or seven extruders. The extrudate is passed through a die where the layers are joined and form a total coextrusion. The multilayer composite exits the dip lips and is quenched. The film is wound into mill logs, and then taken, for example, to a Dusenbury slitter to be slit to the desired width.

Two of the resin streams can be split to provide the polyamide layers and the adhesive layers. In the event that layers 12 and 18 comprise different resins, an additional extruder is used. The outer layer 10 may actually be extruded through two contiguous extruders, in which case an additional extruder would be required.

Although as used in a thermoforming application, the laminate is neither oriented nor irradiated, the material could be irradiated which would cross-link ethylene vinyl acetate copolymer adhesive layers 12 and 18 in the event that such resins were used in the adhesive layers. If an ionomer is used in the sealant layer, irradiation of the laminate would create cross-linking in the sealant layer as well.

In order to optionally orient the laminate, it could be longitudinally oriented, calendared, and/or tenter-framed.

The laminate of the present invention is particularly suited for packaging of meat products such as sliced luncheon meats and hot dogs. In the thermoforming steps described above, this laminate is used as a coextruded rollstock used as a forming web, and may be used in combination with conventional nonforming webs such as cast nylon.

However, the laminate could also be used as a uniweb, i.e. as both forming and nonforming web.

The invention may be further understood by reference to the following examples.

EXAMPLE 1

A thermoformable laminate was prepared in accordance with the present invention by extruding the various resins listed below through six separate extruders.

A first extruder provided a split stream of an ethylene vinyl acetate-based anhydride-grafted polymeric adhesive (du Pont Bynel CXA E-162).

A second extruder provided a split stream of a nucleated nylon 6 (Allied XPN 1586).

A third extruder provided a sealant layer comprising a blend of 96% ionomer (Surlyn A-1650 from du Pont) and 4% of an antiblock agent (Conpol 8750 from du Pont).

A fourth extruder provided the core layer of an oxygen barrier material (EVAL EC-F101 ethylene vinyl alcohol copolymer from EVALCA).

Fifth and sixth extruders provided contiguous layers of polypropylene resin (Norchem NPP 2085 GW).

The adhesive layers had a thickness of 0.39 mils (adjacent the polypropylene layers) and 0.30 mils respectively.

The polyamide layers had thicknesses of 0.42 mils (adjacent the thicker adhesive layer) and 0.30 mils respectively.

The sealant layer had a thickness of 0.61 mils.

The oxygen barrier core layer had a thickness of 0.30 mils.

The two polypropylene layers had a combined thickness of 0.51 mils.

These extrudates were joined in the arrangement described where they entered a coextrusion die. The resulting composite exited the die lips and was quenched, then wound into mill logs, and slit to the desired width using Dusenbury slitters.

The resulting laminate had an overall thickness of about 2.73 mils.

EXAMPLE 2

A thermoformable laminate was prepared as described in Example 1, but with the use of an additional seventh extruder to provide a different adhesive layer adjacent the sealant layer, and comprising another ethylene vinyl acetate copolymer-based, anhydride modified adhesive (Norchem Plexar 3), the other adhesive layer of the structure being the same as described in Example 1.

EXAMPLE 3

A thermoformable laminate was prepared as described in Example 1, but witht he use of a higher viscosity nucleated nylon 6 (BASF F4NL5) instead of the Allied XPN 1586 resin.

The laminate of example 3 was tested as a uniweb (i.e. used as both forming and non-forming webs) on a two-pound carton for bacon. This laminate package exhibited excellent optics, good abuse resistance, and formability. Good sealability was also obtained by the use of the present laminate.

Water quench marks, a problem in some current commercial structures, were not observed with the laminate of Example 3.

In a leaker check, only five of 295 test packages, or 1.69%, showed leakage.

Shaker abuse testing, for one hour at 250 rpm, showed 0% leakers.

Although the present invention has been described in conjunction with preferred embodiments, it is to be understood that modifications and variations may be utilized without departing from the principles and scope of the invention, as those skilled in the art will readily understand. Accordingly, such modifications and variations may be practiced within the scope of the following claims.

What is claimed is:

1. A thermoformable polymeric laminate comprising:
   (a) a core layer comprising an oxygen barrier material;
   (b) a polyamide layer disposed on each surface respectively of the core layer, the polyamide including a nucleating agent;
   (c) an outer sealant layer;
   (d) a second outer layer comprising a moisture barrier material; and
   (e) an intermediate layer disposed between the polyamide layer and each of the sealant layer and second outer layer respectively, and comprising an anhydide grafted polyolefin.

2. The laminate according to claim 1 wherein the oxygen barrier material comprises ethylene vinyl alcohol copolymer.

3. The laminate according to claim 1 wherein the polyamide comprises nucleated nylon 6.

4. The laminate according to claim 1 wherein the sealant layer is a heat-sealable material taken from the group consisting of ionomer, polyolefins, ethylene-alpha olefin copolymers, and blends thereof.

5. The sealant layer according to claim 5 further comprising a small amount of an antiblock agent.

6. The laminate according to claim 1 wherein the outer layer comprises polypropylene.

7. The laminate according to claim 1 wherein the anhydride-grafted polyolefin comprises a polyolefin selected from the group consisting of ethylene vinyl acetate copolymer, polypropylene, low density polyethylene, linear low density polyethylene and very low density polyethylene.

8. The laminate according to claim 1 where the nucleating agent is talc.

* * * * *

UNITED STATES PATENT AND TRADEMARK OFFICE
CERTIFICATE OF CORRECTION

PATENT NO. : 4,735,855

DATED : April 5, 1988

INVENTOR(S) : George D. Wofford and Jack L. Shriver, Jr.

It is certified that error appears in the above-identified patent and that said Letters Patent is hereby corrected as shown below:

In claim 1, (e), column 6, line 4, delete "anhydide" substituting therefore --anhydride--

Signed and Sealed this

Fifteenth Day of November, 1988

Attest:

DONALD J. QUIGG

Attesting Officer

Commissioner of Patents and Trademarks